S. STRAUS.
PULL SOCKET FOR ELECTRIC LAMPS.
APPLICATION FILED JUNE 3, 1916.
1,253,296.
Patented Jan. 15, 1918.
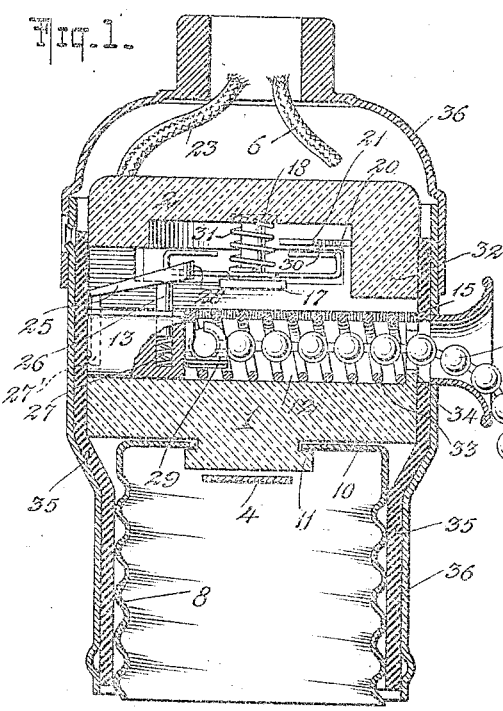
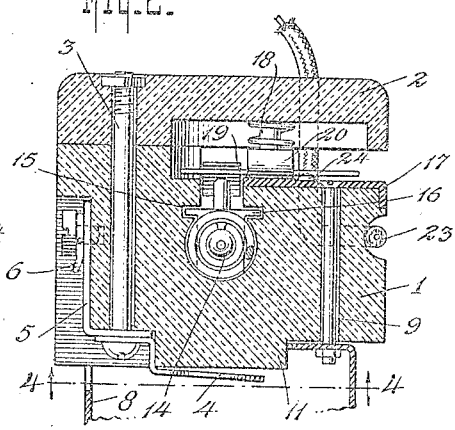
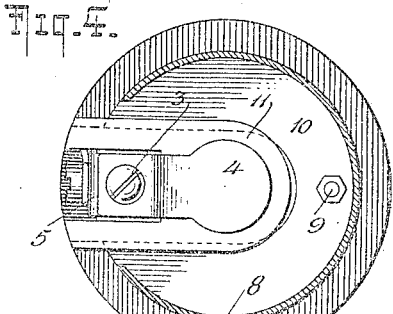
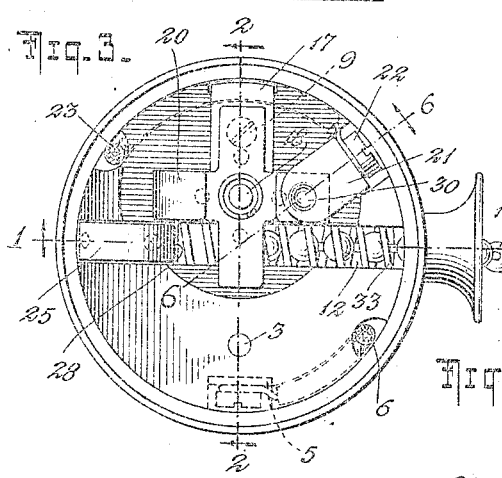
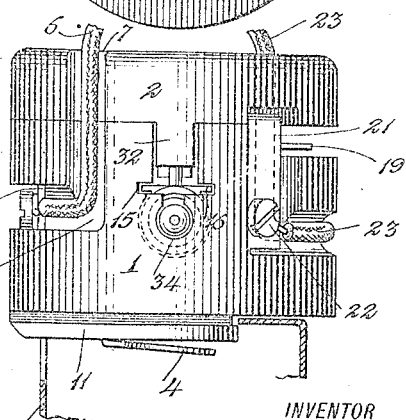
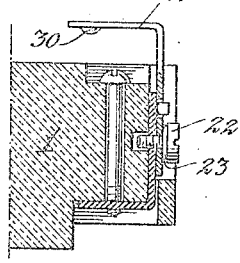
WITNESSES
George Du Bon
Elmer Wirt Young
INVENTOR
SAMUEL STRAUS
BY
Riesen & Schreub
ATTORNEYS WITNESSES:
Fred. A. Lind
JM Proite INVENTOR
Harold B. Taylor
BY
ATTORNEY

UNITED STATES PATENT OFFICE.

HAROLD B. TAYLOR, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,253,297. Specification of Letters Patent. Patented Jan. 15, 1918.

Application filed September 25, 1914. Serial No. 863,585.

*To all whom it may concern:*

Be it known that I, HAROLD B. TAYLOR, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments, and particularly to power-factor meters.

The object of my invention is to provide a polyphase power-factor meter that will operate correctly on a circuit having unbalanced phases.

Heretofore, polyphase power-factor meters have been provided, but the inability of the same to operate correctly on circuits having unbalanced phases rendered them useless under certain conditions of operation.

I provide a meter for determining the power component of the energy traversing a circuit and a second meter for determining the reactive component of the energy traversing the circuit. I arrange these meters, so that the torques of the same are opposed to each other and I provide a variable resistor that is operated, either automatically or manually, to change the amount of resistance in circuit with one of the meters for balancing the torques of the same. Since the torques of the two meters may be made equal at a predetermined power factor, and since the ratio of the power component and the reactive component of the power has a definite value for any power factor, the ratio of the resistances in the two meters, when the torques of the same are balanced, furnishes a definite basis for a power-factor calibration. Since the power supplied to the meters is independent of the relative load on the several phases, the instrument will operate correctly whether the phases are equally or unequally loaded.

Figure 2:
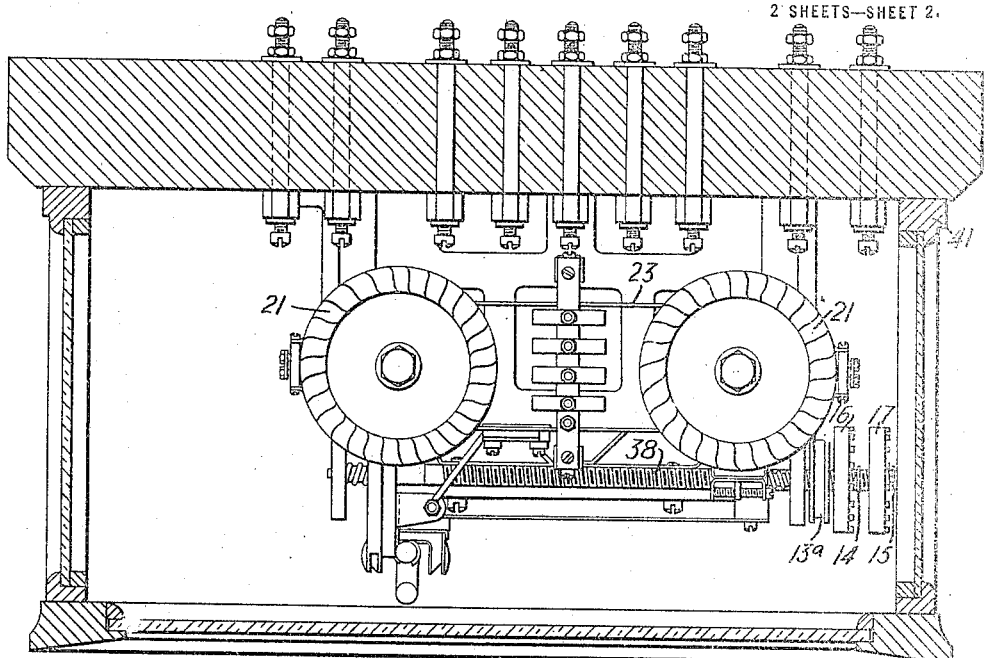
Figure 3:
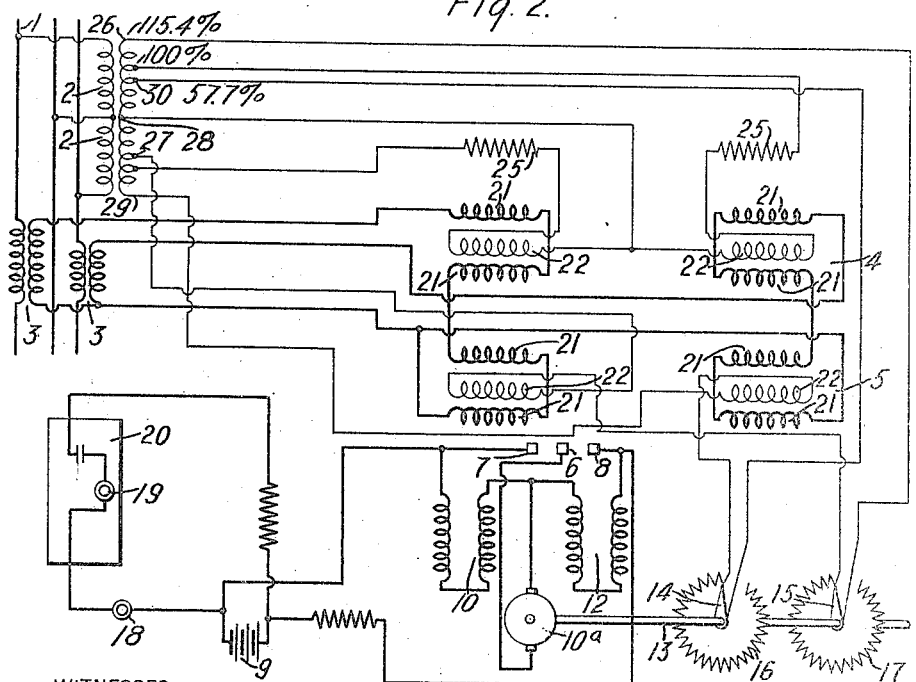

In the accompanying drawings, Figure 1 is a front view, partially in section and partially in elevation, of a graphic or recording power-factor meter embodying my invention; Fig. 2 is a top view, partially in section and partially in plan, of the meter shown in Fig. 1, and Fig. 3 is a diagrammatic view of the circuits of a power-factor meter embodying my invention.

A three-phase circuit 1 is provided with two voltage transformers 2 and two current transformers 3 that supply two meters 4 and 5 with energy that is proportional to the power component of the power traversing the circuit 1 and with energy that is proportional to the reactive component of the power traversing the circuit 1, respectively. The two meters 4 and 5 are mechanically connected together so that the torques of the same oppose each other. A movable contact member 6 is attached to the movable structure of the meters 4 and 5 and is adapted to engage the one or the other of two stationary contact members 7 and 8, when the torques of the two meters are unequal. The engagement of the contact member 6 with the one or the other of stationary contact members 7 and 8 controls a circuit that comprises an auxiliary source 9 of electromotive force and a motor 10 that has an armature $10^a$ and field magnet windings 11 and 12. The motor 10 is adapted to operate a shaft 13 upon which are mounted two movable contact members 14 and 15 that engage resistors 16 and 17, respectively. A rerolling motor 18 and a motor 19 are also supplied with energy from the battery 9. The motor 19 is employed to rewind the main spring of a clock 20 at predetermined intervals.

The meters 4 and 5 are of the Kelvin-balance type and severally comprise four stationary current coils 21 and two movable voltage coils 22, each of the coils 22 being disposed between a pair of the stationary coils 21. The movable coils 22 are mounted on pivotally mounted members 23 that are operatively connected together by a flexible strip 24. The stationary coils 21 are connected to the secondary windings of the current transformers 3 and the movable windings 22 of the meter 4 are so connected to the secondary windings of the voltage transformers 2 that current proportional to the voltage of the circuit 1 flows therein. The movable windings 22 of the meter 5 are so connected to the secondary windings of the voltage transformers 2 that a voltage is impressed thereon that is proportional to the voltage of the circuit 1 but 90° out of phase with the voltage impressed on the meter 4. Resistors 25 are connected in circuit with the movable coils 22 of the meter 4 and the adjustable resistors 16 and 17 are respectively connected in circuit with the two movable coils of the meter 5.

It has been found that a transformer having taps brought out at 57.7%, 100% and 115.4% of the normal voltage will give the desired connections to provide voltages substantially 90° out of phase with each other. That is, the voltage from a 115.4% point 26 on one of the secondary windings of the transformers 2 to a 57.7% point 27 of the other will be equal to $$\sqrt{(115.4)^2 - (57.7)^2}$$

or 100 volts and is at right angles to the normal potential between the points 28 and 29 of the secondary windings of the transformers 2. It will thus be seen that the potential between the 115.4% point 29 and the 57.7% point 30 will likewise be of the normal potential of one of the secondary windings of the transformers 2 but 90° out of phase therewith.

The motor 10 is adapted to drive the shaft 13 through a suitable belt and pulley device 13ᵃ. The shaft 13 is screw-threaded to form a worm screw on which is mounted an internally threaded member 31. The member 31 is provided with a pointer 32 that coöperates with a scale 33 to indicate its displacement, and it is provided also with a marking device 34 that records its positions on a strip of paper 35 which is unrolled from the roller 36 by the clock 20. The paper 35 is rolled upon a roller 37 by the rerolling motor 18. A guiding rod 38 is loosely disposed in the member 31 and is attached, at each of its ends, to a frame work 39 that supports the rollers 36 and 37. The rod 38 prevents the member 31 from rotating when the shaft 13 is rotating and causes the member 31 to move across the strip of paper 35 at a speed that is proportional to the rotation of the shaft 13.

The motor 19, as hereinbefore stated, is adapted to rewind the spring of the clock 20 at predetermined intervals. The clock 20 operates the roller 36 through a plurality of gear wheels 40. Since the clock 20, the motor 19 and the rerolling motor 18 do not form parts of my invention, except as the parts thereof perform their functions in an operative combination, no detailed description of the same will be given. These devices, as shown, are only intended to be illustrative of suitable means for accomplishing particular purposes and it is evident that any other suitable means may be employed.

The meters 4 and 5, the motor 10, the clock 20 and the motor 18 are mounted in a case 41 that has suitable supports and terminal connections for the conductors leading to the various windings of the instrument. The resistors 16 and 17 are mounted on suitable brackets 42 attached to the frame 39.

Since the torques on the meters 4 and 5 are opposed to each other and since the meter 4 has a torque that is proportional to the energy traversing the circuit 1 and the meter 5 has a torque that is proportional to the reactive component of the energy traversing the circuit 1, the two torques may be made equal at a predetermined power factor. In case the power factor changes from that predetermined value, the movable contact member 6 will engage one of the contact members 7 and 8 to cause the armature 10ᵃ to operate, by reason of the energization of the field magnet windings 10 and 12, to rotate the shaft 13 an amount that is proportional to the change in the power factor. The rotation of the shaft 13 causes the device 31 to move along the same, and the resistance of the resistors 16 and 17 to be varied until the resistance connected in circuit with the movable coils of the meter 5 is of such value that the torques of the two instruments are again equal. Since it requires a predetermined amount of resistance to equalize the two torques, the value of this resistance and, consequently, the degree of rotation of the shaft 13 and the degree of movement of the member 31 may be taken as a measure of the power factor of the circuit 1. This will be readily seen since the ratio of the power component and the reactive component of the volt-amperes has a definite value for any given power factor. The ratio of the resistances in the two meters, when the torques of the same balance, is a definite indication of the power factor, and the positions of the marker 34 corresponding to the various positions of the contact members 14 and 15 may be calibrated to indicate in terms of the power factor of the circuit.

My invention is not limited to the particular construction illustrated but may be variously modified within the scope of the appended claims.

I claim as my invention:

1. In a phase-indicating instrument for an electric circuit, the combination with a power-component meter and a reactive-component meter operatively connected to the circuit and adapted to oppose each other in their operation, of a variable resistor connected in circuit with one of the meters, and means controlled by the resultant torques of the two meters for controlling the resistance of the resistor.

2. In an electrical measuring instrument, the combination with a wattmeter and a reactive-component meter having the movable members thereof connected to oppose each other, of electro-responsive means controlled by the resultant force of the movable members, and means connected in circuit with one of the meters and adapted to be actuated by the electro-responsive means for balancing the forces of the said movable members.

3. In a measuring instrument for an electric circuit, the combination with a movable member, of means for actuating the movable member in accordance with the difference between the two components of the apparent energy traversing the circuit, and means controlled by the movable member for causing the same to assume a balanced position.

4. In a power-factor meter for an electric circuit, the combination with a movable member, of means for actuating the movable member in accordance with the difference between the two components of the apparent energy traversing the circuit, and electro-responsive means controlled by the movable member for causing the same to assume a balanced position.

5. In a power-factor meter for an electric circuit, the combination with two opposing movable members, of means for actuating one movable member in accordance with one component of the apparent energy traversing the circuit, means for actuating the other movable member in accordance with the other component of the apparent energy traversing the circuit, and means controlled by the resultant movement of the movable members for causing one movable member to balance the other.

6. In an electrical measuring instrument, the combination with a meter that indicates the power traversing an electric circuit, and a second meter that indicates the reactive component of the apparent power traversing the electric circuit, said meters having their movable members connected to oppose each other, of an electro-responsive means controlled by the resultant force of the said movable members, and means controlled by said electro-responsive means and connected in circuit with one of the meters for equalizing the forces of said movable members.

7. In an electrical measuring instrument, the combination with a meter that indicates the power traversing an electric circuit, and a second meter that indicates the reactive component of the apparent power traversing the electric circuit, said meters having their movable members connected to oppose each other, of an electric motor controlled by the resultant force of said movable members, and means controlled by said motor and connected in circuit with one of the meters for equalizing the forces of said movable members.

8. In an electrical measuring instrument, the combination with a meter that indicates the power traversing an electric circuit, and a second meter that indicates the reactive component of the apparent power traversing the electric circuit, said meters having their movable members connected to oppose each other, of an electro-responsive means controlled by the resultant force of the said movable members, means for inserting resistance in circuit with one of said meters to balance the forces of the movable members thereof, and means for indicating the value of said resistance.

9. In a phase-indicating instrument for an electric circuit, the combination with a power-component meter and a reactive-component meter operatively connected to the circuit and adapted to oppose each other in their operation, of a variable resistor connected in circuit with one of the meters, means controlled by the resultant torques of the two meters for controlling the resistance of the resistor, and means for recording values proportional to the movement of the said means for controlling the resistance of the resistor.

10. In a measuring instrument for electric circuits, the combination with a wattmeter that indicates the power traversing the said circuit, and a meter that indicates the reactive component of the apparent power traversing the said circuit, the movable members of said meters being so mechanically connected as to oppose each other, of an electric motor controlled by the resultant force of said movable members, an adjustable resistor connected in circuit with one of the said meters and controlled by the said electric motor, and a marking device operatively connected to said motor for recording the power factor of the said circuit.

11. In a power-factor meter for a polyphase electric circuit, the combination with two wattmeters, of means for so connecting the wattmeters to the circuit that the meters will be supplied with energy in accordance with the power component and the reactive component, respectively, of the apparent energy traversing the circuit irrespective of its unbalancing, the movable members of said meters being adapted to oppose each other, a variable resistor, means dependent upon the resultant torque of the meters for inserting the resistor in circuit with one of the meters for effecting a balance of their torques, and means for determining the value of the resistance of the resistor.

12. In a power-factor meter for a polyphase electric circuit, the combination with two opposing meters, of means for so connecting the meters to the circuit that they are actuated in accordance with the two components of the apparent energy traversing the circuit irrespective of its unbalancing, a variable resistor, and means dependent upon the resultant torque of the meters for inserting the resistor in circuit with one of the meters to effect a balance in their torques.

In testimony whereof, I have hereunto subscribed my name this 22nd day of Sept., 1914.

HAROLD B. TAYLOR.

Witnesses:
B. H. SMITH,
B. B. HINES.